(12) United States Patent
Hiramatsu et al.

(10) Patent No.: US 7,883,044 B2
(45) Date of Patent: Feb. 8, 2011

(54) SEAT BELT RETRACTOR

(75) Inventors: Koji Hiramatsu, Tokyo (JP); Yasushi Kanamori, Tokyo (JP); Masahiro Shiotani, Tokyo (JP); Miwa Morimoto, Tokyo (JP)

(73) Assignee: Takata Corporation, Tokyo (JP)

( * ) Notice: Subject to any disclaimer, the term of this patent is extended or adjusted under 35 U.S.C. 154(b) by 433 days.

(21) Appl. No.: 11/808,190

(22) Filed: Jun. 7, 2007

(65) Prior Publication Data
US 2008/0017743 A1    Jan. 24, 2008

(30) Foreign Application Priority Data
Jul. 19, 2006   (JP)   ............... 2006-197316

(51) Int. Cl.
B65H 75/48   (2006.01)

(52) U.S. Cl. ............. 242/374; 242/379.1; 242/384.2

(58) Field of Classification Search ............. 242/374, 242/379.1, 384–384.6, 383.2, 383.5; 297/471–478; 280/805, 806, 807
See application file for complete search history.

(56) References Cited

U.S. PATENT DOCUMENTS

| | | | | |
|---|---|---|---|---|
| 5,390,873 A * | 2/1995 | Fujimura et al. | ......... | 242/383.2 |
| 5,526,996 A * | 6/1996 | Ebner et al. | ......... | 242/374 |
| 5,788,176 A | 8/1998 | Ebner et al. | | |
| 5,881,962 A * | 3/1999 | Schmidt et al. | ......... | 242/374 |
| 6,012,667 A * | 1/2000 | Clancy et al. | ......... | 242/379.1 |
| 6,105,893 A | 8/2000 | Schmidt et al. | | |
| 6,363,722 B1 | 4/2002 | Takehara et al. | | |
| 6,412,875 B1 * | 7/2002 | Hibata et al. | ......... | 297/478 |
| 6,532,739 B2 | 3/2003 | Kameyoshi et al. | | |
| 6,715,792 B2 * | 4/2004 | Yamachi et al. | ......... | 280/801.2 |
| 7,290,730 B2 * | 11/2007 | Nagata et al. | ......... | 242/374 |
| 2004/0227030 A1 * | 11/2004 | Nagata et al. | ......... | 242/374 |
| 2005/0178870 A1 | 8/2005 | Loffler et al. | | |
| 2006/0082128 A1 * | 4/2006 | Clute | ......... | 280/807 |
| 2007/0051840 A1 * | 3/2007 | Hiramatsu et al. | ......... | 242/374 |
| 2007/0290496 A1 | 12/2007 | Takamatsu et al. | | |

FOREIGN PATENT DOCUMENTS

| | | |
|---|---|---|
| DE | 296 05 200 U1 | 7/1996 |
| DE | 196 09 524 A1 | 9/1997 |
| DE | 10 2004 007 824 A1 | 9/2005 |
| EP | 1 477 377 A1 | 11/2004 |

(Continued)

Primary Examiner—Michael R Mansen
Assistant Examiner—Juan J Campos
(74) Attorney, Agent, or Firm—Foley & Lardner LLP

(57) ABSTRACT

The disclosed seat belt retractor may include a spool for retracting a seat belt, a torsion bar, a pre-tensioner, and a locking device. The torsion bar may disposed inside the spool, wherein one side of the torsion bar is connected to the spool, and configured to absorb energy of movement of an occupant while being deformed under torsion. The pre-tensioner may be positioned at one side of the spool and configured to generate a rotating drive force for rotating the spool in a retracting direction in a condition of rapid deceleration of a motor vehicle. The locking device may be capable of locking another side of the spool such that a rotation of the spool in a withdrawal direction is suppressed at both an operating time of the pre-tensioner and a non-operating time of the pre-tensioner.

6 Claims, 8 Drawing Sheets

FOREIGN PATENT DOCUMENTS

| | | |
|---|---|---|
| JP | 2002-120693 | 4/2002 |
| JP | 2005/231387 A | 9/2005 |
| JP | 2005-306354 A | 11/2005 |
| JP | 2006-298247 | 11/2006 |
| WO | WO 03/082640 A1 | 10/2003 |
| WO | WO 2007/122824 A1 | 11/2007 |

* cited by examiner

Seat Belt Withdrawing Operation
(When Pre-Tensioner Is Not Operated)

Seat Belt Retracting Operation
(When Pre-Tensioner Is Operated)

SEAT BELT RETRACTOR

BACKGROUND

The present invention relates to a seat belt retractor for a seat belt, and more specifically to a seat belt retractor including an EA mechanism that absorbs energy of inertia applied to an occupant when movement of the occupant is restrained by the locking of the seat belt in an emergency, and a seat belt apparatus including the seat belt retractor.

A seat belt apparatus provided in a seat of a motor vehicle restrains quick movement of an occupant due to the acceleration occurring during a collision of the motor vehicle, and is a requisite apparatus aimed at the safety of the occupant's body.

The seat belt apparatus is generally composed of a seat belt (or webbing), a seat belt retractor, and a buckle device.

The retractor winds up the seat belt around a winding member (or spool), pulls the seat belt inside the retractor with a spring force, and ordinarily houses the seat belt in the condition when the seat belt is pulled inside it. When the occupant wears the seat belt, the housed seat belt is withdrawn from the retractor by pulling on a tongue plate provided at an end of the seat belt on the side opposite to the retracting-side. Then, the seat belt is worn by latching the tongue plate into the buckle device provided by the side of the seat.

In the thus constructed retractor, when a shock is applied during a collision, the seat belt is locked so as to prevent the seat belt from being withdrawn from the winding member, and the occupant's body, which is being moved quickly forward, is restrained by the locked seat belt. Currently, a pre-tensioner and a locking mechanism are generally provided to further strongly restrain the occupant's body at a time of rapid deceleration of the motor vehicle or the like.

The pre-tensioner removes the slack (or looseness) of the seat belt when an acceleration sensor detects that the motor vehicle is brought to a condition of rapid deceleration, and thereby improves the restraining force generated by the seat belt. In the pre-tensioner, there is, for example, a system where the slack of the seat belt is removed by the contraction of the entire length in a longitudinal direction of an expanding structure through the expansion of a bag-shaped body caused by the generating gas from a gas-generating device in response to a detecting signal of the acceleration sensor; a system where the slack of the seat belt is removed by the sliding of a piston inside a cylinder by the gas from a gas-generating device, thereby rotating the spool in a seat belt retracting direction via a pinion; or the like.

The locking mechanism is provided with a locking member or base that rotates together with the spool. Further, in the locking mechanism, a hooking member or pawl provided in the locking base is hooked on an inner tooth provided in a fixing side member of the motor vehicle, such as a frame of the retractor or the like, in response to the detecting signal of the acceleration sensor. Thus, a rotation of the locking base and the spool in a seat belt withdrawal direction is limited.

On the other hand, when forward movement of the occupant is quickly restrained at the time of rapid deceleration of the motor vehicle or the like as described above, an impactive force caused by the force of the restraint of the occupant's body is acted on the chest portion of the occupant or the like via the seat belt. An energy absorption mechanism (hereinafter called an "EA mechanism") is known where a predetermined tension load of the seat belt is held while applying an unwinding resistance to the seat belt at a predetermined strength or more just after the seat belt is locked, so as to ease up the impactive force acting on the occupant, and in this condition, the seat belt is unwound within a predetermined length, and thereby the energy of the collision acting on the occupant is absorbed.

In this method, a shaft or torsion bar capable of being plastically deformed is disposed inside the spool that winds up the seat belt. One side of the torsion bar is connected to a spool side and the other side of the torsion bar is connected to a locking base side. Further, when the locking base is locked so as not to be rotatable by the locking mechanism at the time of the rapid deceleration of the motor vehicle occurring in an emergency or the like, the tension force of the seat belt restraining the occupant that moves forward by the inertia force serves as a relative rotation force in the withdrawal direction of the seat belt on one side of the torsion bar versus the other side. When the relative rotation force reaches a certain value or more, the torsion bar is plastically deformed and the energy of the collision is absorbed by the resistance of the plastic deformation at this time. Thus, regardless of the effect of the locking mechanism, the spool gradually rotates in the seat belt withdrawal direction, the seat belt is unwound while receiving the tension force of a certain value or more, and the force acting between the seat belt and the occupant's body is lessened.

For example, the seat belt retractor in Japanese Unexamined Patent Application Publication No. 2002-120693, is provided with a pre-tensioner connected with the spool in a rotating connection, a locking mechanism, and an EA mechanism as described above. When a slight rotation of the spool in the seat belt withdrawal direction is allowed during the operation of the EA mechanism, the pre-tensioner is already operating in the seat belt retracting direction (namely, in a reverse direction).

However, in the aforementioned known technology, the below problem exists. In the situation in which one side of the torsion bar in a spool is connected to a pre-tensioner, and a locking base to be locked by a locking mechanism is connected to the other side of the torsion bar, and when the locking mechanism locks the rotation in the retracting direction of the other side of the torsion bar after the pre-tensioner is operated in the retracting direction of the spool, and when the one side of the torsion bar performs a relative rotation while being twisted against the other side by an EA mechanism, an operation of the pre-tensioner is performed in the reverse direction to the direction of the relative rotation thereof, and the operation of the pre-tensioner blocks the relative rotation. The operation of the EA mechanism receives an influence of the operation of the pre-tensioner. This situation results in it being difficult to secure a stable operation.

SUMMARY

An object of an embodiment of the present invention is to provide a seat belt retractor capable of securing a stable EA operation without receiving the influence of the operation of the pre-tensioner, and a seat belt apparatus using such a seat belt retractor.

A first embodiment of the present invention may include a spool for retracting a seat belt; a torsion bar disposed inside a spool in a radial direction, in which one side in an axial direction thereof is connected to the spool, and configured to be capable of absorbing energy of movement of an occupant while being deformed under torsion by a relative displacement of the one side in the axial direction to the other side in the axial direction; a pre-tensioner positioned at the other side in the axial direction of the spool and configured to generate a rotating drive force for rotating the spool in a retracting direction of the seat belt in a condition of rapid deceleration of a motor vehicle; and a locking device capable of locking the other side in the axial direction of the torsion bar so that a rotation of the spool in a withdrawal direction of the seat belt is suppressed at both an operating time of the pre-tensioner and a non-operating time of the pre-tensioner.

In the first embodiment, the pre-tensioner may be operated in response to the rapid deceleration of the motor vehicle at a time of rapid deceleration thereof, and the spool may be rotated in the retracting direction of the seat belt via the torsion bar by the rotating drive force. This action results in the improvement of the restraining force for restraining the occupant by the seat belt. Thereafter, although the occupant's body pulls the seat belt with a predetermined force or more by means of inertia at the time of rapid deceleration of the motor vehicle, and the force in a withdrawal direction of the seat belt is strongly acting on the spool, the locking device locks the other side in the axial direction of the torsion bar on the fixing side member of the motor vehicle at the time of rapid deceleration of the motor vehicle. Thus, the one side of the torsion bar in the axial direction and the spool connected thereto cause a relative rotation displacement to the other side in the axial direction of the torsion bar, and the energy of movement of the occupant can be absorbed by a deformation under torsion of the torsion bar, an EA mechanism. Further, because the pre-tensioner is positioned at the other side of the spool, an operation of the EA mechanism where the one side of the torsion bar performs a relative rotation while being twisted against the other side, can secure a stable operation without receiving an influence of the operation of the pre-tensioner.

In a manner as described above, in the first embodiment of the present invention, the one side in the axial direction of the torsion bar and the spool connected thereto can be released by locking only the other side in the axial direction of the torsion bar because of the deformation under torsion of the torsion bar at the time of rapid deceleration of the motor vehicle. Accordingly, a stable EA operation can be secured without receiving the influence of the operation of the pre-tensioner.

On the other hand, in the first embodiment, the other side in the axial direction of the torsion bar can be locked by the locking device in a manner so as to suppress a rotation of the spool in the retracting direction of the seat belt at both the operating time and the non-operating time of the pre-tensioner. Even at the time of a slight collision, a slow deceleration of the motor vehicle or the like where the pre-tensioner is not operated, the rotation of the spool connected to the one side of the torsion bar via the torsion bar in the withdrawal direction of the seat belt can be suppressed by locking the other side in the axial direction of the torsion bar by the locking device. As a result, when a load applied to the torsion bar by an inertia force of the occupant's body is relatively small, a withdrawing operation for the seat belt is locked, and when the load applied to the torsion bar is relatively large, the energy of movement of the occupant is absorbed by the EA mechanism.

Thus, according to the first embodiment of the present invention, not only at the operating time of the pre-tensioner, but also at the time of a slight collision or the like when the pre-tensioner is not operated, the energy of movement of the occupant can be absorbed by operating the EA mechanism. Accordingly, the safety of the occupant can be improved.

The second embodiment of the present invention may be characterized in that, besides the features of the first embodiment, the seat belt retractor may include a locking member disposed at the other side in the axial direction of the spool and connected to the other side in the axial direction of the torsion bar. The locking device may lock the other side in the axial direction of the torsion bar by locking the locking member on a fixing side member of the motor vehicle with a hooking member at the non-operating time of the pre-tensioner.

In the second embodiment of the present invention, the other side in the axial direction of the torsion bay may be locked by hooking the locking member on the fixing side member of the motor vehicle with the hooking member at the time of the slight collision, the slow deceleration of the motor vehicle, or the like when the pre-tensioner is not operated. By limiting the rotation of the locking member using the hooking member as described above, the other side in the axial direction of the torsion bar can be securely locked. As a result, the rotation of the spool connected to the one side via the torsion bar in the withdrawal direction of the seat belt can be suppressed. Thus, even in the non-operating time of the pre-tensioner at the time of the slight collision or the like, the energy of movement of the occupant can be absorbed by operating the EA mechanism. Accordingly, the safety of the occupant can further be improved.

The third embodiment of the present invention may be characterized in that, in addition to the features of the first or second embodiments, in the operating time of the pre-tensioner, the locking device locks the other side in the axial direction of the torsion bar by keeping the pressure generated by the pre-tensioner to suppress the rotation of the other side in the axial direction of the torsion bar in the withdrawal direction of the seat belt for a predetermined period.

In the third embodiment of the present invention, in the operating time of the pre-tensioner, the other side in the axial direction of the torsion bar may be locked by keeping the pressure generated in the pre-tensioner. Thus, even when a joint pin is ruptured by the deformation under torsion generated in the torsion bar at the operating time of the pre-tensioner, the other side in the axial direction of the torsion bar can be securely locked. Accordingly, the energy of movement of the occupant can be absorbed by operating the EA mechanism at the operating time of the pre-tensioner.

The fourth embodiment of the present invention is characterized in that, in addition to the features of the second or third embodiments, the hooking member may be a pawl rotatably provided in the locking member, and the locking device may lock the locking member by rotating the pawl in a locking direction by a locking gear disposed at one side in the axial direction of the spool via a joint pin. Thus, the other side in the axial direction of the torsion bar can be securely locked by limiting the rotation of the locking member using the pawl.

The fifth embodiment of the present invention is characterized in that, in addition to the features of the fourth embodiment, the joint pin may be configured to be ruptured when a deformation under torsion is generated in the torsion bar, and the seat belt retractor may include an urging device for urging the pawl in an unlocking direction where a locking operation for the locking member is not performed when the joint pin is ruptured, and for allowing the pawl to move in the locking direction where the locking member is locked by a centrifugal force against the urging force when the seat belt is withdrawn at a predetermined speed or more.

In the fifth embodiment, in a case that the occupant pulls out the seat belt at a usual speed for wearing the seat belt, after the joint pin is ruptured due to a collision or the like, the seat belt can usually be withdrawn because the pawl is urged in the unlocking direction by the urging device. On the other hand, in a case that the seat belt is withdrawn at a predetermined speed or more in a case that the motor vehicle is again in a collision or the like, the pawl moves in the locking direction, the locking member is locked, and the withdrawing operation for the seat belt is locked. Thus, according to this embodiment, even after the EA mechanism is once operated due to a collision or the like, and the joint pin is thereby ruptured, a minimum function of the seat belt, such as the locking operation for locking the withdrawing operation for the seat belt or the like at the time of collision, can be secured. As a result, the safety of the occupant can be secured, for example, during the time in which the motor vehicle is moved from the place of the accident to another place (for example, a detail shop or the like).

A sixth embodiment of the present invention is characterized in that, in addition to any of the features of the first through fifth embodiments, the seat belt retractor may include a deceleration detecting device for detecting the deceleration of the motor vehicle, and the locking device may lock the other side in the axial direction of the torsion bar when the predetermined deceleration or more is detected by the deceleration detecting device. Thus, even at the non-operating time of the pre-tensioner in a slight collision or a slow deceleration of the motor vehicle or the like, the other side in the axial direction of the torsion bar can be locked by the locking device.

The seventh embodiment of the present invention is characterized in that, in addition to the features of the sixth embodiment of the present invention, the seat belt retractor may include the deceleration detecting device at one side in the axial direction of the spool. Thus, a construction can be formed in which the deceleration detecting device is disposed at a side opposite to the pre-tensioner, and the locking member is locked by the pawl disposed at the pre-tensioner side via the joint pin. As a result, a balance (with regards to weight and/or space) at both sides in the axial direction of the seat belt retractor can be improved, and the mounting property of the seat belt retractor on the motor vehicle can be improved.

An eighth embodiment of the present invention is characterized in which a seat belt retractor according to any one of the first through seventh embodiments; a seat belt retracted by the seat belt retractor in a manner so as to be capable of being withdrawn and restraining the occupant; a tongue provided on the seat belt; and a buckle device so that an occupant may wear the seat belt by latching the buckle device with the tongue are provided.

According to an embodiment of the present invention, a stable EA operation can be secured which does not receive influence from an operation of a pre-tensioner.

It is to be understood that both the foregoing general description and the following detailed descriptions are exemplary and explanatory only, and are not restrictive of the invention as claimed.

BRIEF DESCRIPTION OF THE DRAWINGS

The features, aspects and advantages of the present invention will become apparent from the following description, appended claims, and the accompanying exemplary embodiments shown in the drawings, which are briefly described below.

DETAILED DESCRIPTION

Hereinbelow, an embodiment of the present invention will be explained with reference to the drawings. The present embodiment is an example where the present invention is applied to a seat belt apparatus of an automobile.

Figure 1:
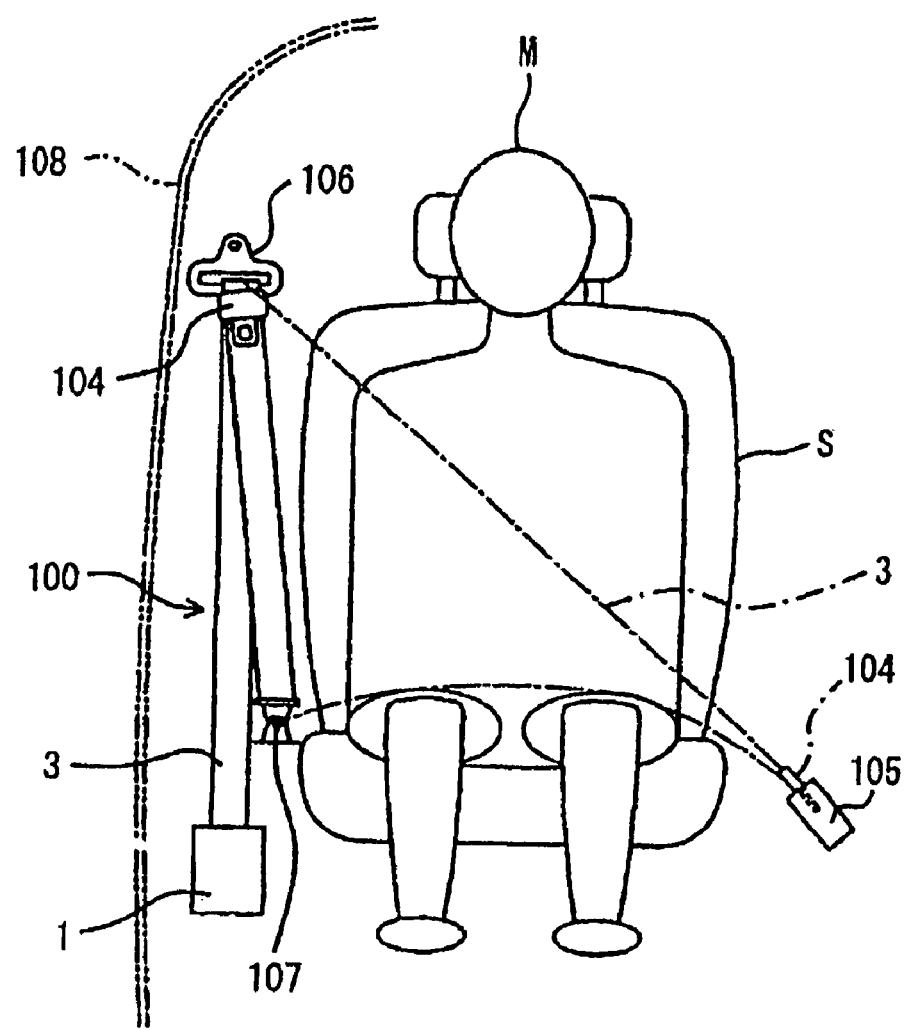
FIG. 1 is a front view of a seat belt apparatus provided with a seat belt retractor according to an embodiment of the present invention.

FIG. 1 is a front view illustrating a structure of a seat belt apparatus provided with a seat belt retractor according to the present embodiment, together with an occupant.

In FIG. 1, a seat belt apparatus 100 is disposed in a vehicle body 108 of a motor vehicle, and may be provided with a seat belt 3 for restraining an occupant M in a seat S; a seat belt retractor 1 for retracting one side of the seat belt 3 in a manner in which the seat belt is capable of being withdrawn; a tongue 104 slidably provided on the seat belt 3; and a buckle device 105 to be latched with the tongue 104.

One side of the seat belt 3 is retracted by the seat belt retractor 1 as described above, and a middle portion of the seat belt 3 is inserted into a shoulder anchor 106. An end portion of the other side of the seat belt 3 is rotatably connected to a motor vehicle 108 side by a clamp 107.

Figure 2:
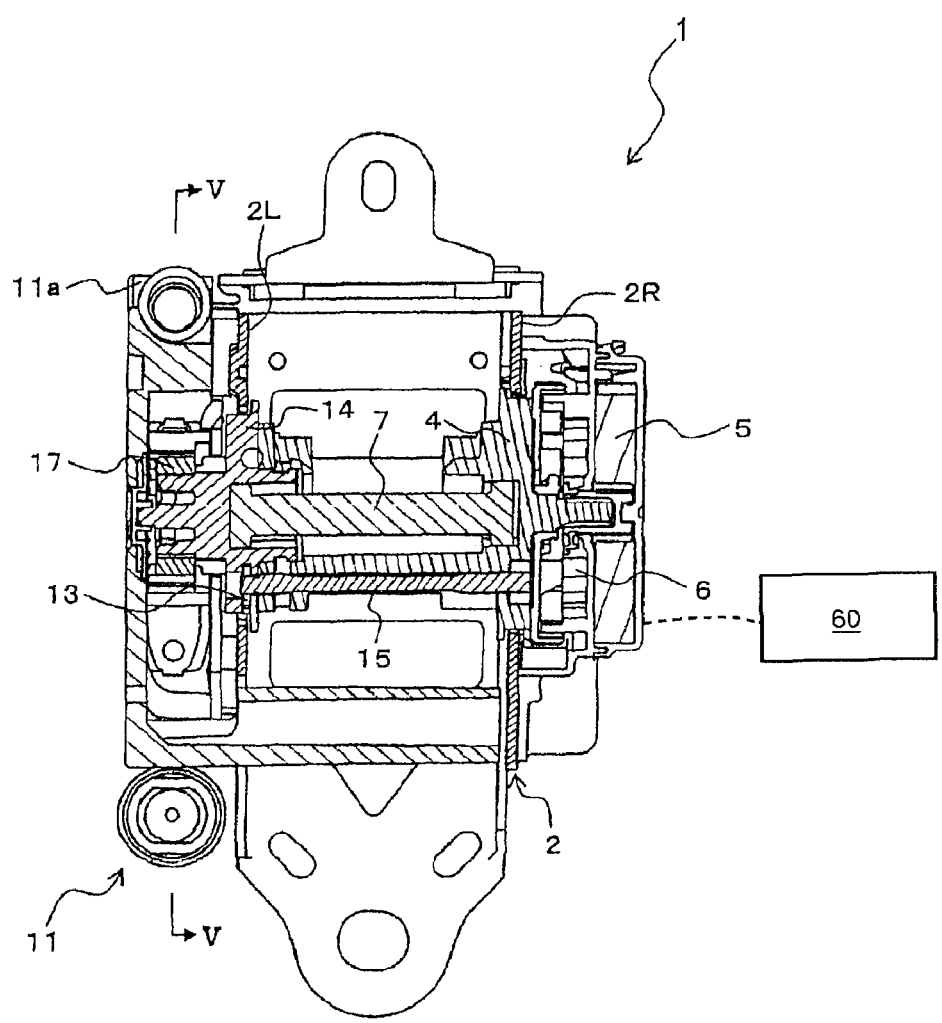
FIG. 2 is a longitudinal cross-sectional view of a seat belt retractor according to an embodiment of the present invention.

FIG. 2 is a longitudinal cross-sectional view illustrating a schematic structure of the seat belt retractor 1 according to an embodiment of the present invention.

In FIG. 2, the seat belt retractor 1 may include two parallel side walls 2L and 2R, a C-shaped frame 2 (a fixing side member) having a rear face wall (not shown) bridging the two walls so as to combine them, and a spool 4 for retracting the seat belt 3 (not shown in FIG. 2) while being rotatably supported between both side walls 2L and 2R of the frame 2. The seat belt retractor 1 further includes a deceleration detecting device 60 and a locking gear 6. The deceleration detecting device 60 is operated when detecting a slow deceleration of the motor vehicle, which occurs in a slight collision of the motor vehicle or the like, and is provided at one side (the right side in FIG. 2) in an axial direction of the spool 4. The locking gear 6 is for suppressing at least a rotation of the spool 4 in the belt withdrawal direction while being operated by the deceleration detecting device, and is provided at the one side in the axial direction of the spool 4. The seat belt retractor 1 further includes a torsion bar 7 that is loosely fitted on and penetrated through an inside of the spool 4 in the axial direction. One side in the axial direction (the right side in FIG. 2) of the torsion bar 7 is connected to the spool 4 in a manner so as to be capable of allowing a relative rotation displacement with the spool 4 at a predetermined amount (described later in detail), and which the deformation under torsion occurring due to a relative displacement between the one side and the other side (the left side in FIG. 2) in the axial direction is allowed, and is thereby capable of absorbing the energy of the movement of the occupant M. The seat belt retractor 1 may further include a spiral spring 5 that constantly urges the spool 4 in a seat belt retracting direction; a locking base or locking member 14 that is rotatably supported by the frame 2 at the other side of the torsion bar 7 and the spool 4, and is fixed to the other side in an axial direction of the torsion bar 7; and a pawl or hooking member 13 for locking the locking base 14 on the side wall 2L of the frame 2 in response to the deceleration of the motor vehicle, while being swingably held by the locking base 14. The seat belt retractor 1 may further include a pre-tensioner 11 and a joint pin 15. The pre-tensioner 11 is positioned at the other side in the axial direction of the torsion bar 7 and the spool 4, which generates a rotating drive force for rotating the spool 4 in the retracting direction of the seat belt 3 by being operated at a time of rapid deceleration of the motor vehicle occurring in an emergency or the like, and transmits the rotating drive force to the locking base 14. The joint pin 15 extends from a rotating shaft of the pawl 13 and reaches up to the locking gear 6 while penetrating through the spool 4.

Figure 3:
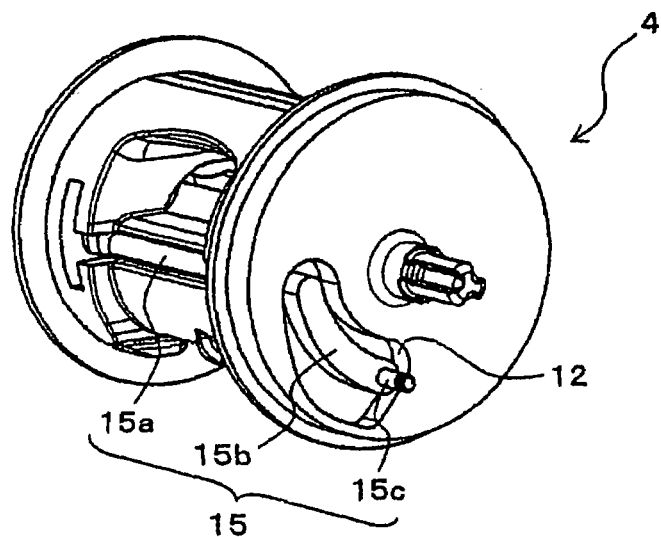
FIG. 3 is a perspective view of a spool and a joint pin.

FIG. 3 is a perspective view illustrating the spool 4 and the joint pin 15.

In FIG. 3, the joint pin 15 may include a shaft portion 15a extending from a rotating shaft of the pawl 13 (not shown in FIG. 3) up to one side in the axial direction (the front right side in FIG. 3) of the spool 4 while penetrating the spool 4; an arm portion 15b provided at an end portion of the one side of the shaft portion 15a in the axial direction of the spool 4; and an operating pin 15c provided at a tip end portion of the arm portion 15b in a manner so as to be protruding toward the one side in the axial direction of the spool 4. Incidentally, the shaft portion 15a of the joint pin 15 is configured to be ruptured when the deformation under torsion occurs in the torsion bar 7 (described later in detail). By such a configuration as described above, the arm portion 15b is formed to be swingable around the shaft portion 15a as a center in an opening portion 12 provided at the one side in the axial direction of the spool 4. The pawl 13 connected to the opposite side is moved in a locking direction where the locking base 14 is locked on the side wall 2L of the frame 2, or in an unlocking direction where the locking base 14 is not locked on the side wall 2L of the frame 2 along the swing of the arm portion 15b.

The movement of the pawl 13 in the locking direction or the unlocking direction is performed by swinging the arm portion 15b with the locking gear 6 (not shown in FIG. 3). The locking gear 6 is similar to a known locking gear of this kind. At the time of the slow deceleration of the motor vehicle, the operating pin 15c is moved to an outer peripheral side by the deceleration detecting device, and the pawl 13 protrudes out in an outer peripheral direction more than the spool 4. This movement forms a locking condition. Thus, the pawl 13 is hooked on or meshed with an inner tooth of the side wall 2L of the frame 2, and a rotation of the spool 4 in the withdrawal direction of the seat belt 3 is suppressed (refer to FIG. 4(b) described later). Further, when the motor vehicle is stopped and is brought to a stable condition thereafter, the locking gear 6 returns the operating pin 15c to an inner periphery side and releases the locking condition of the pawl 13.

Figure 4A:
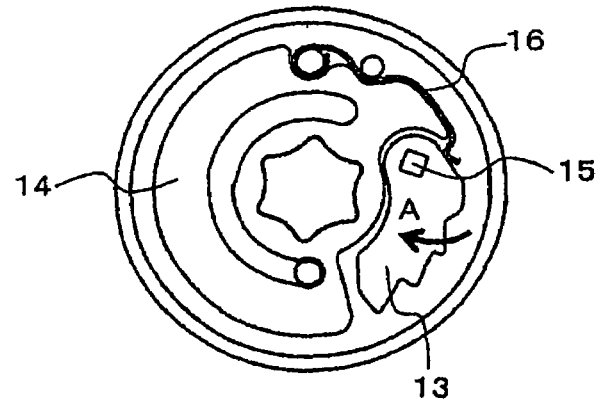
FIGS. 4(a) and 4(b) are side views of a pawl being moved into an unlocking direction, and the pawl being moved into a locking direction, respectively.
Figure 4B:
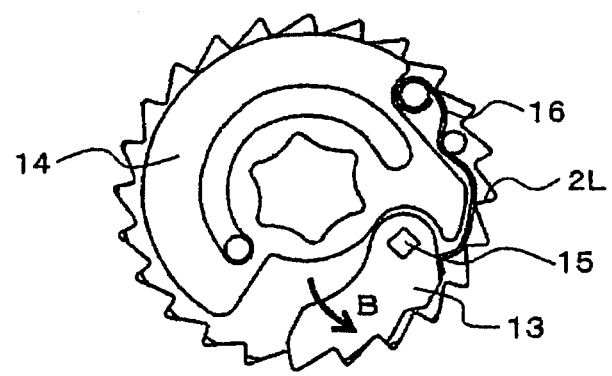

FIG. 4(a) and FIG. 4(b) are views illustrating the operations of the pawl 13 described above, in which FIG. 4(a) is a view showing a condition where the pawl 13 is moved into the unlocking direction, and FIG. 4(b) is a view showing a condition where the pawl 13 is moved into the locking condition.

In an ordinary operation, namely when the slow deceleration of the motor vehicle is not detected by the deceleration detecting device, the locking gear 6 is driven toward the unlocking side, and accordingly the arm portion 15b of the joint pin 15 swings toward the unlocking side (toward the inside in the radial direction of the spool 4) via the operating pin 15c hooked on the locking gear 6. As a result, as shown in FIG. 4(a), the pawl 13 connected to the other side in the axial direction of the joint pin 15 is moved in the unlocking direction (a direction indicated by an arrow A in the drawing) where the locking base 14 is not locked on the side wall 2L of the frame 2. Thus, the locking base 14 is brought to a freely rotatable condition together with the spool 4. For example, the occupant M can withdraw the seat belt 3 from the retractor 1 when wearing the seat belt 3.

In the locking base 14, a spring or urging device 16 for urging the pawl 13 in the unlocking direction may be provided. The spring 16 may urge the pawl 13 in the unlocking direction when the EA mechanism is operated and the torsion bar 7 is deformed under the torsion resulting in the rupture of the joint pin 15. The spring 16 allows the pawl 13 to move in the locking direction by centrifugal force resisting against the urging force when the seat belt 3 is withdrawn at a predetermined speed or more (described later in detail).

On the other hand, at the time of deceleration or a collision of the motor vehicle, namely in a case where the slow deceleration of the motor vehicle is detected by the deceleration detecting device, the locking gear 6 is driven toward the locking side. Thus, the arm portion 15b of the joint pin 15 swings toward the locking side (the outside in the radial direction of the spool 4) via the operating pin 15c hooked on the locking gear 6. As a result, as shown in FIG. 4(b), the pawl 13 connected to the other side in the axial direction of the joint pin 15 is moved in the locking direction (in a direction indicated by an arrow B in the drawing) where the locking base 14 is locked to the side wall 2L of the frame 2. Thus, the locking base 14 is locked in a condition where the rotation in the belt withdrawal direction, together with the spool 4 is prevented. As a result, for example, at the time of the deceleration or collision of the motor vehicle, a withdrawing operation for the seat belt 3 from the retractor 1 is locked and the quick movement of the occupant M's body is restrained.

Although the pawl 13 is constantly urged in the unlocking direction by the spring 16, in the deceleration or collision of the motor vehicle, the pawl 13 is moved in the locking direction resisting against the urging force of the spring 16 by the locking gear 6.

Figure 5:
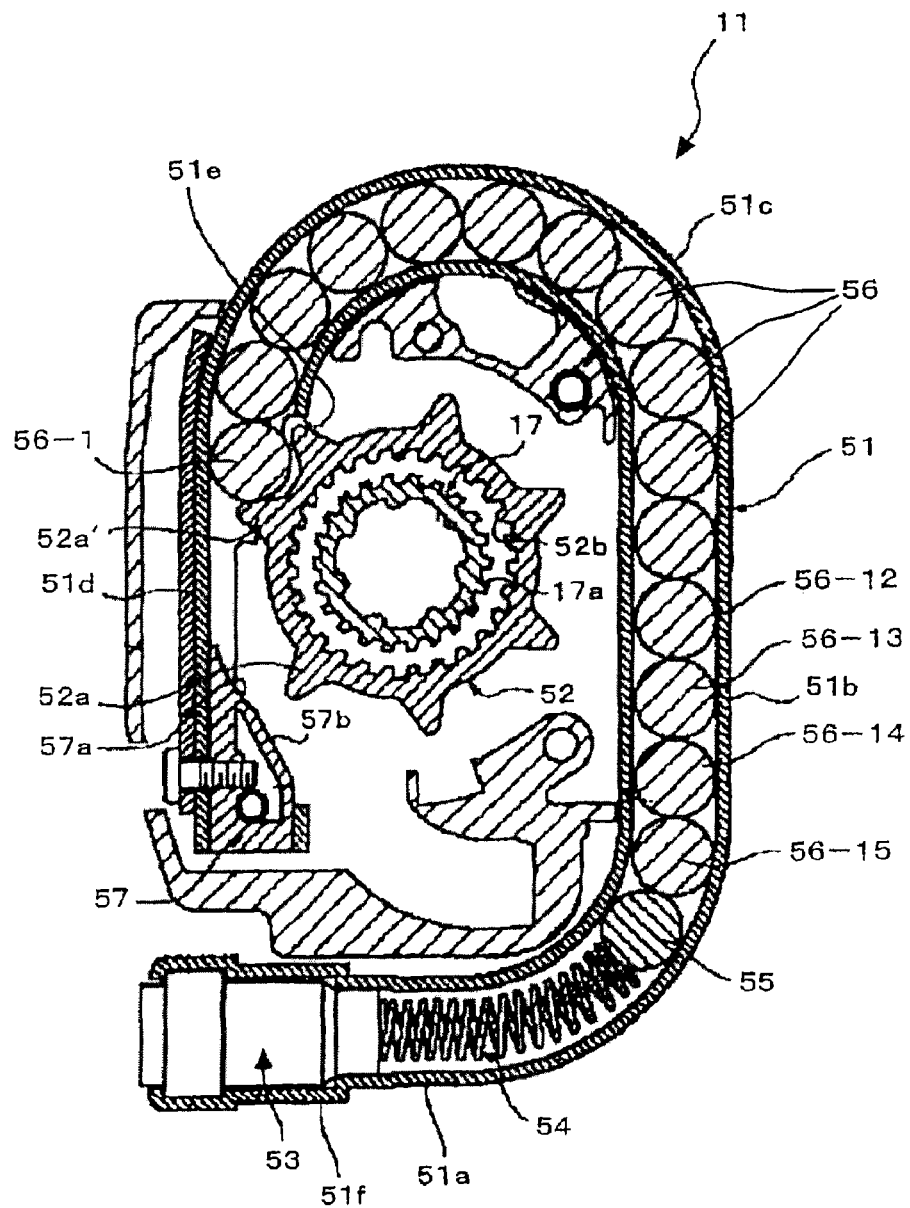
FIG. 5 is a cross-sectional view of a pre-tensioner along the sectional line V-V in FIG. 2 before the pre-tensioner is operated.
Figure 6:
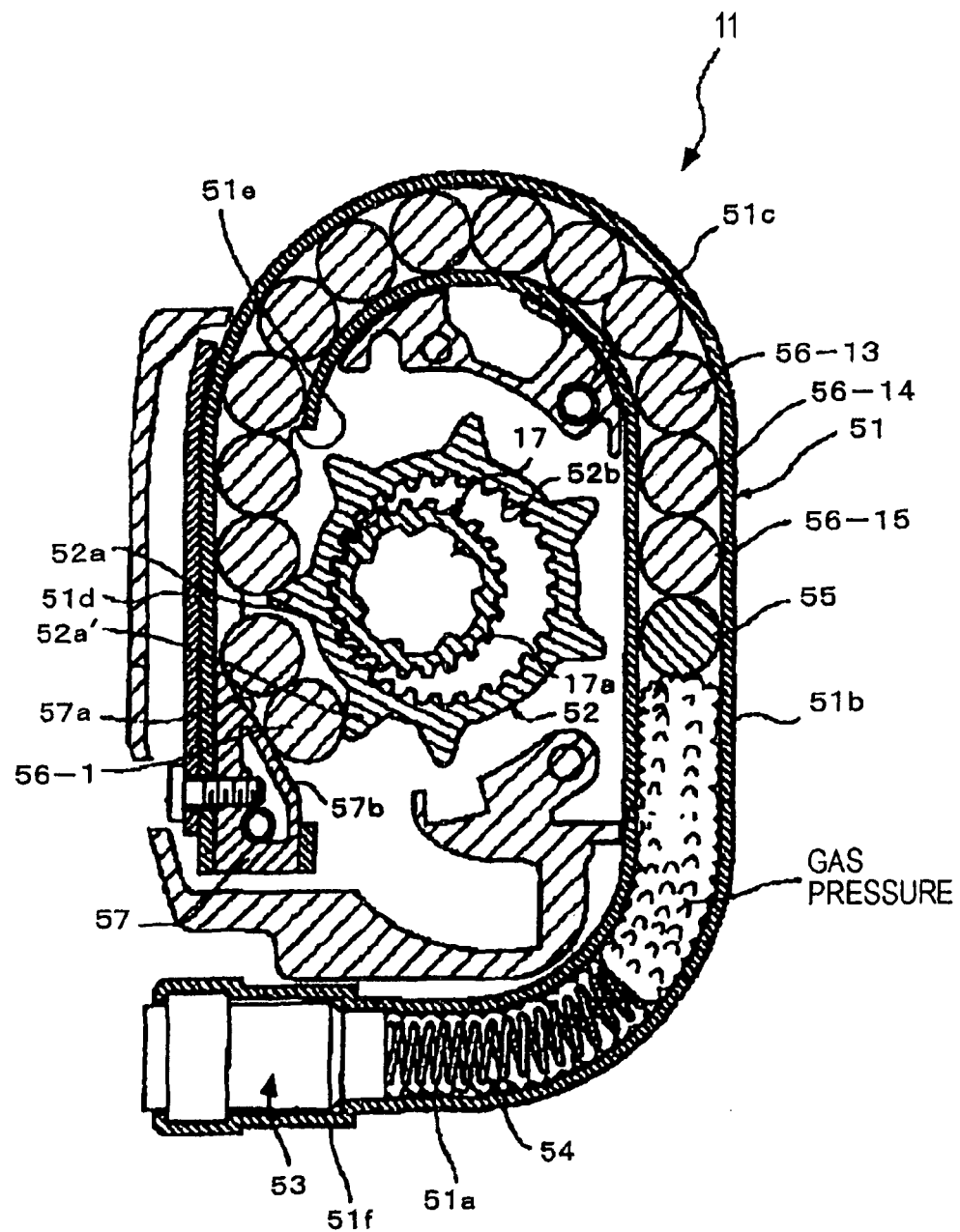
FIG. 6 is a cross-sectional view of the pre-tensioner along the section line V-V in FIG. 2 just after the pre-tensioner is operated.

FIG. 5 and FIG. 6 are cross-sectional views of the pre-tensioner along the sectional line V-V in FIG. 2, in which FIG. 5 is a view showing a condition before the pre-tensioner 11 is operated and FIG. 6 is a view showing a condition just after the pre-tensioner 11 is operated.

In FIG. 5 and FIG. 6, the pre-tensioner 11 may include a pipe or pipe line 51 attached to an outside of the side wall 2L of the frame 2 while being inflected into an approximate C-shape; a ring gear 52 disposed at an inner periphery side of the pipe 51; a gas generator 53 provided in a base end portion 51a (at a lower side in FIGS. 5 and 6) of the pipe 51; and a coil spring 54 connected to the gas generator 53 in the inside of the pipe 51. The pre-tensioner 11 may further include one piston ball 55 disposed in the inside of the pipe 51 so as to be in contact with the coil spring 54, a plurality of balls 56 (15 in number in this example) disposed in the inside of the pipe 51 while moving from the piston ball 55 up the gas generator 53 side; and a guide block 57 attached to the inside of an end portion at a side opposite to a base end portion 51a of the pipe 51.

The pipe 51 may be formed by bending a steel pipe into an approximately ellipse-like C-shape for example, and may be attached in a configuration of being sandwiched between the side wall 2L of the frame 2 and a pre-tensioner cover 11a

(refer to FIG. 2). The pipe 51 may be inflected from the base end portion 51a at a lower part in FIG. 5 and FIG. 6 to the upper right at an angle of about 90° and may be connected to a straight line portion 51b. Further, the pipe 51 may be connected to a half circle portion 51c at an upper part in FIG. 5 and FIG. 6. A tip end of the half circle portion 51c is connected to a straight line portion 51d directed to a lower part in FIG. 5 and FIG. 6. A cutout portion 51e is formed at a side surface of an inner periphery side of the straight line portion 51d. At the inner periphery side of the cutout portion 51e, an outer tooth 52a of the ring gear 52 is intruding.

The ring gear 52 is held at a home position at the inner periphery side of the pipe 51 by a plurality of shear pins (not shown) formed in the pre-tensioner cover 11a (refer to FIG. 2). Further, at the inner periphery side of the ring gear 52, a pinion 17 fixed to the locking base 14 is disposed.

In the inner peripheral surface of the ring gear 52, the inner tooth 52b that can be meshed with an outer tooth 17a of the pinion 17 is formed. Because the inner peripheral diameter of the ring gear 52 is formed to be greater than an outer peripheral diameter of the pinion 17, a sufficient clearance is secured between the inner tooth 52b of the ring gear 52 and the outer tooth 17a of the pinion 17 so that both of the inner tooth 52b and the outer tooth 17a cannot be meshed with each other in a condition before the pre-tensioner 11 is operated as shown in FIG. 5. Accordingly, in an ordinary wearing condition, the spool 4 can freely be rotated regardless of the existence of the pre-tensioner 11. This condition is one such that a clutch mechanism composed of the ring gear 52 and the pinion 17 is cut out.

On an outer peripheral surface of the ring gear 52, a plurality of projection-shaped outer teeth 52a (seven in number in an illustrated example), which is overhanging outward, is formed. Although the respective outer teeth 52a are lined up at interval along a peripheral direction of the ring gear 52 so that two balls 56 are able to be sandwiched therebetween, there is one space between two outer teeth 52a' adjoining each other at a certain place, which are offset in an interval such that only one ball 56 is able to be sandwiched. In a condition before the pre-tensioner 11 is operated, as shown in FIG. 5, the offsetted two outer teeth 52a' intrude into the cutout portion 51e of the straight line portion 51d of the pipe 51. Further, the head side ball 56-1 in the pipe 51 is previously sandwiched between these two outer teeth 52a' and is in contact with the same.

At a base end portion 51a of the pipe 51, a gas generator housing portion 51f which is slightly thicker than the pipe 51 is formed. In the gas generator housing portion 51f, a gas generator 53 is housed. The gas generator 53 is fixed by swaging the flange portion from outside after the gas generator 53 is housed in the gas generator housing portion 51f. This gas generator 53 ignites gunpowder in response to a signal transmitted from the rapid deceleration detecting device (not shown) at the time of rapid deceleration of the motor vehicle occurring in the emergency or the like. The gas generator 53 supplies blowing-out gas pressure into the pipe 51, as shown in FIG. 6. The pipe 51 is constructed to have high airtightness in which the blown-out gas cannot be leaked out, from the gas generator housing portion 51f at the base end portion 51a to the cutout portion 51e at the other end portion.

In the condition before the pre-tensioner 11 is operated, as shown in FIG. 5, the coil spring 54, the piston ball 55, and the fifteen balls 56 are housed in turn from the gas generator 53 side, in the inside of the pipe 51. The ball 56 is a spherically shaped element made of metal such as steel or the like. An outer diameter of each of the balls 56 is formed to be slightly smaller than the inner diameter of the pipe 51, and each of the balls 56 can relatively smoothly move in the inside of the pipe 51. Furthermore, the head side ball 56-1 is in contact with the two offsetted outer teeth 52a' of the ring gear 52.

The piston ball 55 is made of resin such as silicone rubber or the like. The piston ball 55 is configured to be able to move while being in sliding contact with the inner surface of the pipe 51 in an airtight manner by being deformed and expanded after the blowing-out gas is discharged. The piston ball 55 serves as the seal for preventing the gas from being leaked to the end portion at the side opposite to the base end portion 51a of the pipe 51. In the condition before the pre-tensioner 11 is operated, shown in FIG. 5, the coil spring 54 is disposed between the gas generator 53 and the piston ball 55, and the piston ball 55 is urged in a direction headed for the opposite end portion of the pipe 51 by the coil spring 54. By means of the urging force of the coil spring 54, the head side ball 56-1 is in contact with the two offsetted outer teeth 52a' of the ring gear 52.

At the end portion of the straight line portion 51d of the pipe 51, the guide block 57 is attached. The guide block 57 may have a cylindrical shape where the tip end thereof is obliquely cut, and the oblique surface serves as a guide surface. The guide surface is composed of a first guide surface 57a and a second guide surface 57b. The first guide surface 57a is formed into an arc shape which is approximately concentric with the ring gear 52 at an upper end portion of the guide block 57. The ball 56 that is shot out from the pipe 51 collides with the first oblique surface 57a at a time when the pre-tensioner 11 is operated. On the other hand, the second guide surface 57b is formed to be a flat surface, and is configured to gradually recede from the ring gear 52.

Next, an operation of the pre-tensioner 11 having the aforementioned construction will be explained. When the pre-tensioner 11 shown in FIG. 5 is not operated (the ordinary wearing condition), the ring gear 52 is held at a home position at the inner periphery side of the pipe 51 by the plurality of shear pins (not shown) formed in the pre-tensioner cover 11a (refer to FIG. 2). The ring gear 52 is not meshed with the pinion 17. Accordingly, the locking base 14 freely rotates regardless of the pre-tensioner 11.

When a colliding condition of the motor vehicle is detected, a signal is transmitted to the gas generator 53. By means of this signal, as shown in FIG. 6, the gas generator 53 is ignited and the blown-out gas pressure is supplied into the pipe 51. By means of the blown-out gas pressure, the piston ball 55 which is closest to the gas generator 53 is pressed first, and then the plurality of the balls 56 are pressed in turn by the pushing force of the piston ball 55. Further, the pressing force is transmitted to the headmost ball 56-1 (the ball being in contact with the two outer teeth 52a' of the ring gear 52). Incidentally, because the piston ball 55 is deformed and expanded by the gas pressure at this time, a sealing function is generated between the piston ball 55 and the inner surface of the pipe 51. Thus, the gas is not leaked to the end portion at the side opposite to a base end portion 51a of the pipe 51. Because the pipe 51 is constructed with high airtightness, the blown-out gas for the piston ball 55 to drive the ball 56 is not leaked in, and a power loss of the pre-tensioner 11 does not occur.

Then, the pressure force is applied to the ring gear 52 by the pressure force of the ball 56, and the shear pin of the pre-tensioner cover 11a is sheared. The ring gear 52 is brought to a free state and moved to a pinion 17 side, and the inner tooth 52b of the ring gear 52 and the outer tooth 17a of the pinion 17 mesh with each other. This action results in a clutch-connecting condition. The ring gear 52 rotates around a concentric center axis by the pressure force of the ball 56 for pressing the outer tooth 52a. At a time before the ring gear 52 starts moving, the ball 56-1 at the head side is in contact with the outer tooth 52a' of the ring gear 52 in a posture of applying rotation force thereto. Therefore, the ring gear 52 assuredly starts rotation.

Further, when the piston ball 55 and the ball 56 are pushed out after receiving the blowing-out gas pressure, respective balls 56, in turn, are engaged with a valley between the outer teeth 52a of the ring gear 52. In this case, two balls 56 each are engaged with one valley of the ring gear 52. The ring gear 52 rotates counterclockwise in FIG. 6 by the balls 56 that are engaged with the valleys. Because the outer tooth 17a of the pinion 17 and the inner tooth 52b of the ring gear 52 are meshed with each other, the rotation of the ring gear 52 is transmitted to the pinion 17, and both of the ring gear 52 and the pinion 17 engagingly rotate with each other. Because the pinion 17 is fixed to the locking base 14, the locking base 14 is rotated together with the pinion 14. Incidentally, the condition, shown in FIG. 6, just after the pre-tensioner 11 is operated, is an example, and the position of the piston ball 55 in the pipe 51 may vary based on a relationship between a body type, posture, or the like of the occupant M and the seat belt 3.

By having an EA mechanism that is operated by the deformation under torsion of the torsion bar 7, a shock applied to the occupant M by the seat belt 3 is absorbed and eased up. Further, the blowing-out gas pressure in the pipe 51 is sufficiently maintained for a short period of time (for a period when the operation of the EA mechanism is needed) even after the EA mechanism is operated, and the driving force of the locking base 14 in a direction of retracting rotation is maintained. At the time of operation of the EA mechanism, the rotation in the withdrawal direction of the seat belt 3 in the locking base 14 is locked.

As described above, the locking gear 6, the joint pin 15 and the pawl 13, or the pre-tensioner 11 may constitute a locking device.

The operation and advantages of the seat belt retractor 1 as described above will be explained using FIG. 7 through FIG. 9. Arrows shown in FIG. 7 through FIG. 9 indicate a route where a load is applied.

Figure 7:
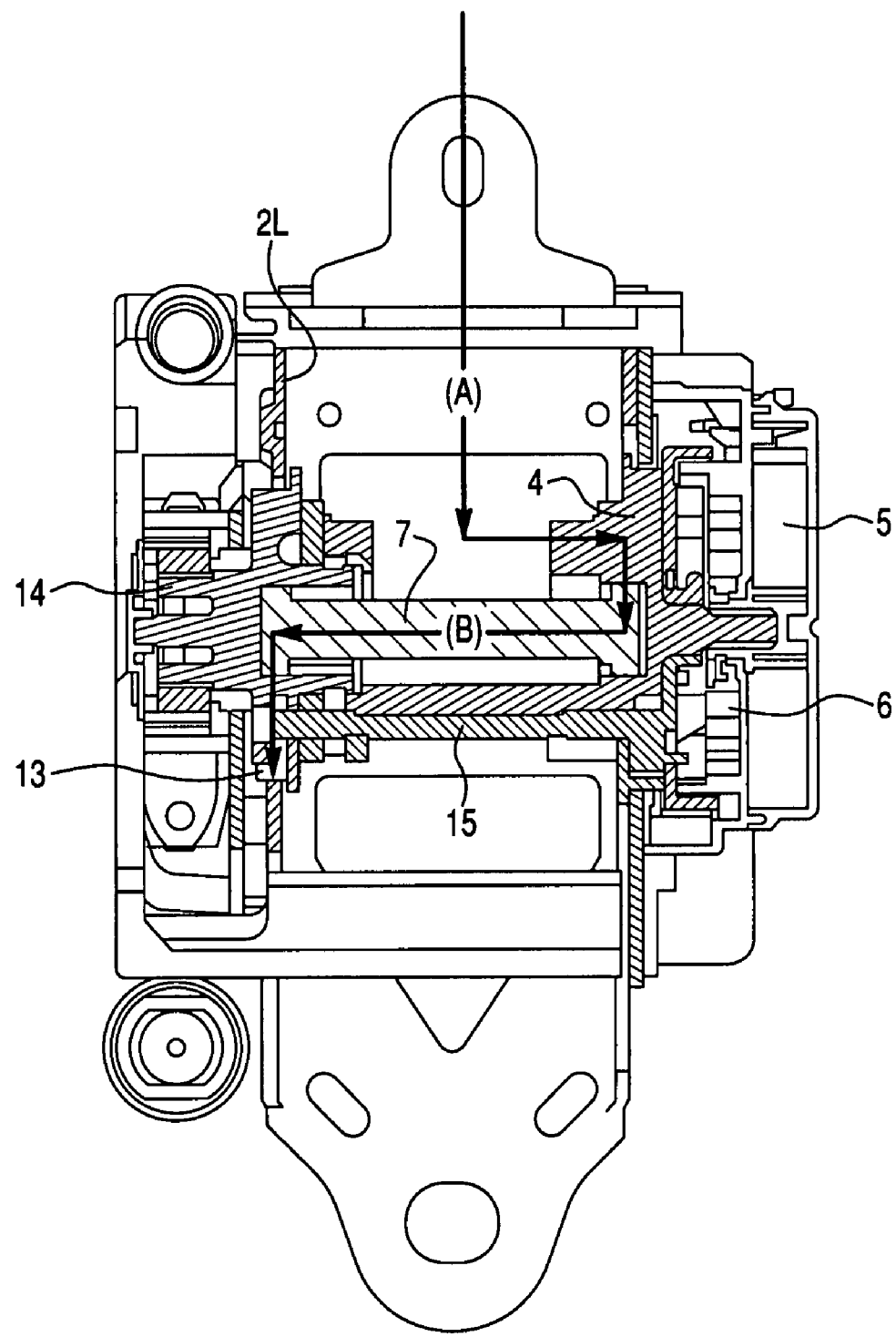
FIG. 7 is a schematic view of an operation of the seat belt retractor in an ordinary wearing condition.

FIG. 7 is a view explaining an operation of the seat belt retractor 1 in an ordinary wearing condition.

In the ordinary wearing condition, the pawl 13 is moved in the unlocking direction by the locking gear 6 via the joint pin 15, in which the locking base 14 is not locked on the side wall 2L of the frame 2, and the pawl 13 is brought into an unlocking condition. Accordingly, the locking base 14, the torsion bar 7, and the spool 4 are configured to be integral with each other and to be freely rotatable. When the seat belt 3 is not worn, the seat belt 3 is completely retracted by the urging force of the spiral spring 5.

When the seat belt 3 is withdrawn at the usual speed for wearing (refer to a reference character (A) in FIG. 7), the spool 4 is rotated in the withdrawal direction of the seat belt 3, and the seat belt 3 is smoothly withdrawn. The tongue 104 that is slidably provided on the seat belt 3 is inserted and latched into the buckle device 105 fixed to the vehicle body. Thereafter, the excess of the withdrawn seat belt 3 is retracted with the spool 4 by the urging force of the spiral spring 5, and the seat belt 3 is fitted on the occupant M to an extent that there is no feeling of the application of pressure.

When the seat belt 3 is quickly withdrawn, the deceleration detecting device is operated by the large deceleration that occurs at this time. By the operation of the deceleration detecting device, the locking gear 6 rotates the pawl 13 in the locking direction via the joint pin 15 in a manner as described above, and hooks the same on the inner tooth of the side wall 2L of the frame 2. Thus, the rotation force applied to the spool 4 by the tension load of the seat belt 3 is transmitted to the spool 4, the torsion bar 7, the locking base 14, and the pawl 13, and received by the side wall 2L of the frame 2 that is hooked with the pawl 13 (refer to the reference character (B) in FIG. 7).

As a result, in a case that the load applied to the torsion bar 7 via the spool 4 by the inertia force of the occupant M's body is relatively small, the withdrawing operation for the seat belt 3 is locked. On the other hand, in a case that the load applied to the torsion bar 7 by the inertia force of the occupant M's body is relatively large, the torsion bar 7 is deformed under torsion by the EA mechanism, and the energy of movement of the occupant M can be absorbed. Thus, even at the time of a slight collision or the like, when the pre-tensioner 11 is not operated, the energy of movement of the occupant M can be absorbed by operating the EA mechanism.

Figure 8:
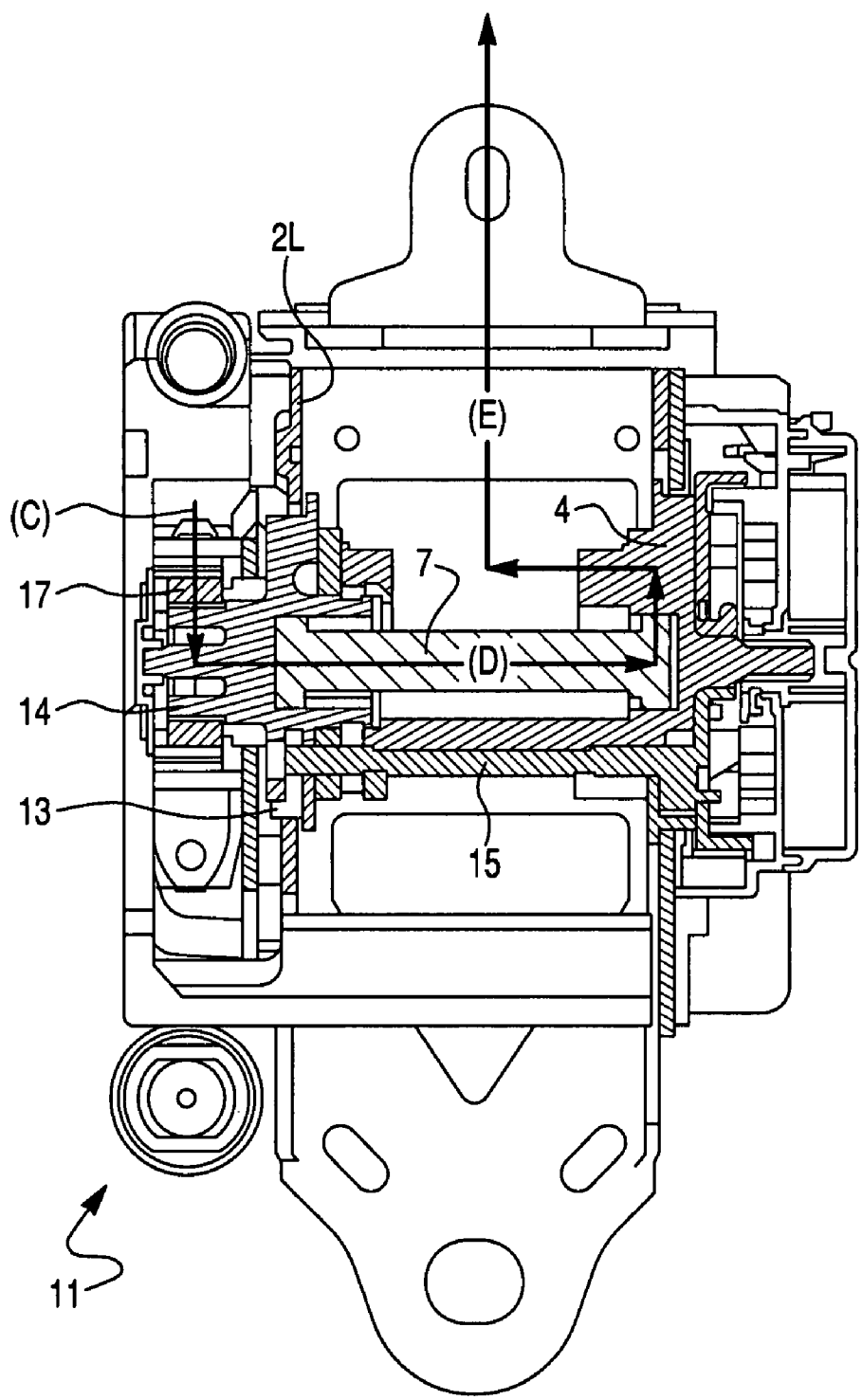
FIG. 8 is a schematic view of a retracting operation of a seat belt by the pre-tensioner of the seat belt retractor in a rapid deceleration of a motor vehicle.

FIG. 8 is a view explaining a retracting operation for the seat belt 3 by the operation of the pre-tensioner 11 in the operation of the seat belt retractor 1 at a time of rapid deceleration of the motor vehicle.

As illustrated in FIG. 8, at the time of rapid deceleration of the motor vehicle in the emergency or the like, the pre-tensioner 11 is operated in response to the rapid deceleration, and the rotating drive force is transmitted to the locking base 14 via the pinion 17 (refer to reference character (C) in FIG. 8).

At this moment, in a case that the locking base 14 causes the relative rotation displacement with the spool 4 at a predetermined amount or more by the rotating drive force of the pre-tensioner 11, and the deformation under torsion is thereby caused in the torsion bar 7, the shaft portion 15a of the joint pin 15 is ruptured as described earlier. Thus, the pawl 13 is released from a drive control by the locking gear 6. Further, the pawl 13 is moved in the unlocking direction (a direction indicated by the arrow A in FIG. 4) where the locking base 14 is not locked on the side wall 2L of the frame 2 by the urging force of the spring 16. As a result, the locking base 14 is brought to a state to be freely rotatable together with the spool 4 (refer to FIG. 4(a)).

Thereafter, the rotating drive force transmitted to the locking base 14 from the pre-tensioner 11 via the pinion 17 is transmitted to the spool 4 via the torsion bar 7 (refer to reference character (D) in FIG. 8). The spool 4 is rotated by a predetermined amount in the retracting direction of the seat belt 3, and the seat belt 3 is retracted by a predetermined amount (refer to reference character (E) in FIG. 8). Thus, the restraining force for the occupant M by the seat belt 3 is improved.

Figure 9:
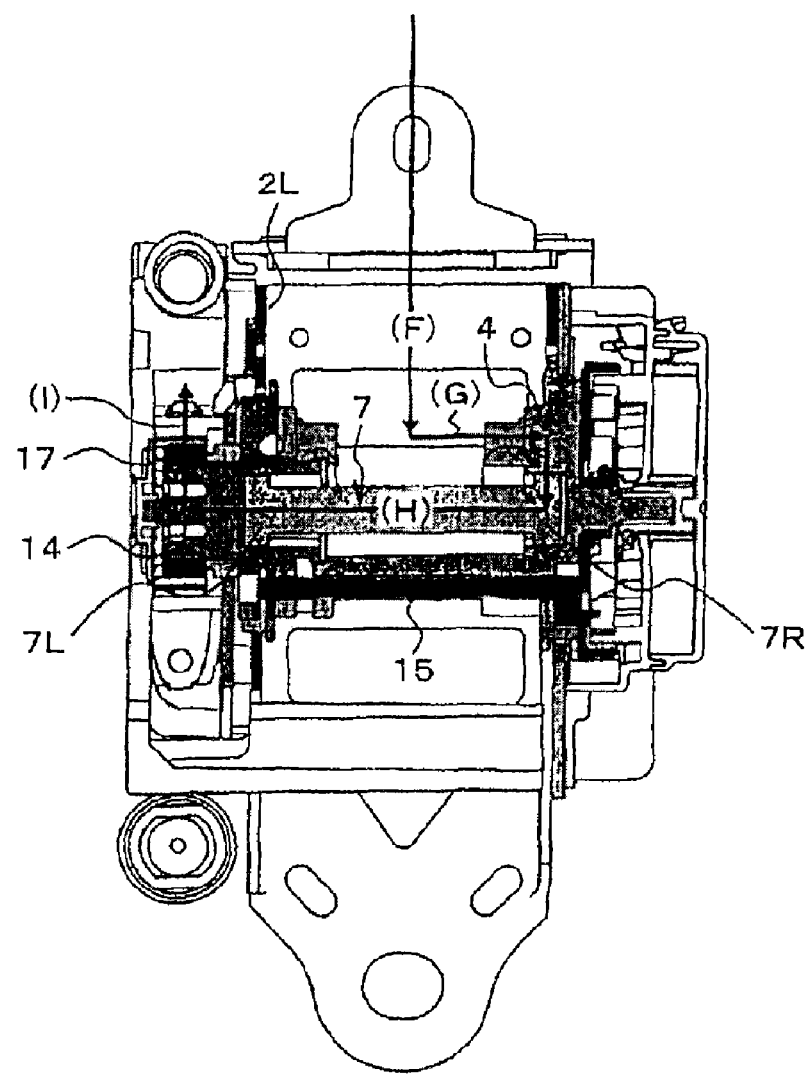
FIG. 9 is schematic view of a withdrawing operation of the seat belt by an EA mechanism of the seat belt retractor in the rapid deceleration of the motor vehicle.

FIG. 9 is a view explaining the withdrawing operation for the seat belt 3 by the EA mechanism in the operations of the seat belt retractor 1 in the rapid deceleration of the motor vehicle.

As illustrated in FIG. 9, after the retracting operation for the seat belt 3 is performed by operation of the pre-tensioner 11, the occupant M's body pulls the seat belt 3 at a predetermined force or greater by means of the inertia force at the time of rapid deceleration of the motor vehicle (refer to reference character (F) in FIG. 9). Thus, the force in the withdrawal direction of the seat belt 3 is largely applied to the spool 4 (refer to reference character (G) in FIG. 9). This force is transmitted to the torsion bar 7 and the locking base 14 from the spool 4 (refer to reference character (H) in FIG. 9). Currently, as described above, although the locking base 14 is not locked by the pawl 13, the rotation of the locking base 14 in the withdrawal direction of the seat belt 3 is locked by the drive force of the pre-tensioner 11 in the rotating direction for retracting the seat belt 3. This situation is because the blowing-out gas pressure in the pipe 51 is sufficiently maintained for a short period of time (for a period when the operation of the EA mechanism is needed) even after the pre-tensioner 11 is operated, as described earlier. The force transmitted to the locking base 14 from the spool 4 via the torsion bar 7 is received by the pressure-keeping force of the pre-tensioner 11 via the pinion 17 (refer to reference character (I) in FIG. 9). As a result, a part 7R at one side (the right side in FIG. 9) in the axial direction of the torsion bar 7 connected to the spool 4 forms the relative rotation displacement with a part 7L at the other side (the left side in FIG. 9) in the axial direction. The energy of movement of the occupant M is absorbed by the deformation under torsion (torque of torsion) of the torsion bar 7, and the load applied to the seat belt 3 can be limited by the EA mechanism.

When a certain time has elapsed after the EA mechanism is operated as described above, the blowing-out gas pressure in the pipe 51 of the pre-tensioner 11 is lowered, and the locking operation by the pressure kept in the pre-tensioner 11 is released. Thus, although the locking base 14 is brought to a state to be freely rotatable with the spool 4, in a case that the seat belt 3 is withdrawn at a predetermined speed or more, the pawl 13 is moved in the locking direction by the centrifugal force against the urging force by the spring 16 as described above. The withdrawing operation for the seat belt 3 is thereby locked. Even after the joint pin 15 is ruptured by the EA mechanism being operated once, the minimum function of the seat belt 3, such as the locking operation for the withdrawing operation for the seat belt 3 at the time of collision, or the like can be secured.

According to the seat belt retractor 1 explained above, because the pre-tensioner 11 is positioned at the other side in the axial direction (the left side in FIG. 9) of the spool 4 as described above and is connected to the locking base 14, the operation of the EA mechanism where the part 7R of the one side of the torsion bar 7 performs a relative rotation with the part 7L of the other side while being twisted as described above, can secure a stable operation without receiving an influence of the operation by the pre-tensioner 11.

Further, in the seat belt retractor 1, as illustrated in FIG. 7, at the time when the pre-tensioner 11 is not operated, a rotation of the other side in the axial direction of the torsion bar 7 is locked by the pawl 13. Thus, even at the time of a slight collision, a slow deceleration of the motor vehicle, or the like, in which the pre-tensioner is not operated, the other side of the torsion bar 7 in the axial direction is locked. Further, the rotation of the spool 4 connected to the one side of the torsion bar 7 via the torsion bar 7 in the withdrawal direction of the seat belt 3 can be suppressed. As a result, in a case that the load applied to the torsion bar 7 by the inertia force of the occupant M's body is relatively small, the withdrawing operation for the seat belt 3 is locked, and in a case that the load applied to the torsion bar 7 is relatively large, the energy of movement of the occupant M is absorbed by the EA mechanism. Therefore, according to the present embodiment, the energy of movement of the occupant M can be absorbed by operating the EA mechanism not only at the time when the pre-tensioner is operated, but also at the time of a slight collision or the like when the pre-tensioner is not operated. Consequently, the safety of the occupant M can be improved.

Furthermore, because the spring 16 is provided in the locking base 14, the pawl 13 is urged in the unlocking direction where the locking base 14 is not locked when the EA mechanism is operated and the joint pin 15 is thereby ruptured, and when the seat belt 3 is withdrawn at a predetermined speed or more, the pawl 13 is allowed to move in the locking direction where the locking base 14 is locked by the centrifugal force against the urging force. In a case that the seat belt 3 is withdrawn by the occupant M at a usual speed for wearing the seat belt 3 after the joint pin 15 is ruptured due to a collision or the like, the seat belt 3 can be withdrawn in the usual manner because the pawl 13 is urged in the unlocking direction by the spring 16. On the other hand, in a case that the seat belt 3 is withdrawn at a predetermined speed or more when the motor vehicle is again in a collision or the like, the pawl 13 moves in the locking direction and thus the locking base 14 is locked. This action results in the locking of the withdrawing operation for the seat belt 3. Thus, even after the EA mechanism is once operated due to a collision or the like and the joint pin 15 is ruptured, a minimum function of the seat belt 3 such as the locking operation for the withdrawing operation for the seat belt 3 during a collision or the like can be secured. As a result, the safety of the occupant M, for example, during the time in which the motor vehicle is to be moved from a place of an accident to another place (for example, a detail shop or the like) can be secured.

Moreover, the deceleration detecting device that may be operated by detecting the slow deceleration of the motor vehicle occurring in a slight collision of the motor vehicle or the like is disposed at one side in the axial direction of the spool 4. Thus, a construction can be formed in which the deceleration detecting device is disposed at a side opposite to the pre-tensioner 11, and the locking base 14 is locked by the pawl 13 disposed at a pre-tensioner 11 side via the joint pin 15. As a result, a balance (weight, space) at both sides in the axial direction of the spool 4 of the seat belt retractor 1 can be improved, and the mounting property of the seat belt retractor 1 on the motor vehicle can be improved.

Incidentally, a concrete construction of the above-described embodiment does not strictly limit the content of the present invention, and it is natural to say that various modifications therefore can be made along the purpose of the present invention with regard to the details.

The priority application Japanese Patent Application No. 2006-197316, filed Jul. 19, 2006, is incorporated by reference.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat belt retractor comprising:
   a spool for retracting a seat belt, wherein the spool has one side in an axial direction of the spool and another side in the axial direction of the spool;
   a torsion bar disposed inside the spool, wherein the torsion bar has one side in an axial direction of the torsion bar and another side in the axial direction of the torsion bar, wherein the one side of the torsion bar is connected to the one side of the spool, and configured to be capable of absorbing energy of movement of an occupant while being deformed under torsion by a relative displacement of the one side of the torsion bar and the another side of the torsion bar;
   a pre-tensioner positioned at the another side of the spool and configured to generate a rotating drive force for rotating the spool in a retracting direction of the seat belt in a condition of rapid deceleration of a motor vehicle;
   a locking device capable of locking the another side of the torsion bar such that a rotation of the spool in a withdrawal direction of the seat belt is suppressed at both an operating time of the pre-tensioner when the pre-tensioner is activated and a non-operating time of the pre-tensioner when the pre-tensioner is not activated; and a locking member disposed at the another side of the spool and connected to the another side of the torsion bar, wherein the locking device comprises a locking gear disposed at the one side of the spool, a joint pin, and a pawl rotatably provided in the locking member, and wherein the locking device is configured to lock the another side of the torsion bar by locking the locking member on a frame with the pawl at the non-operating time of the pre-tensioner by rotating the pawl in a locking direction using the locking gear via the joint pin.

2. The seat belt retractor according to claim 1, wherein the joint pin is configured to be ruptured when a deformation under torsion is generated in the torsion bar.

3. The seat belt retractor according to claim 2, further comprising an urging device for urging the pawl in an unlocking direction where a locking operation for the locking member is not performed when the joint pin is ruptured, and wherein the pawl is configured to move in the locking direction such that the locking member is locked by a centrifugal force against an urging force of the urging device when the seat belt is withdrawn at or greater than a predetermined speed.

4. The seat belt retractor according to claim 1, further comprising a deceleration detecting device for detecting deceleration of the motor vehicle, wherein the locking device is configured to lock the another side of the torsion bar when the deceleration detecting device detects a predetermined or greater deceleration.

5. The seat belt retractor according to claim 4, wherein the deceleration detecting device is provided at the one side of the spool.

6. A seat belt apparatus comprising:
a seat belt retractor comprising:
a spool, wherein the spool has one side in an axial direction of the spool and another side in the axial direction of the spool, a torsion bar disposed inside the spool, wherein the torsion bar has one side in an axial direction of the torsion bar and another side in the axial direction of the torsion bar, wherein the one side of the torsion bar is connected to the one side of the spool, and configured to be capable of absorbing energy of movement of an occupant while being deformed under torsion by a relative displacement of the one side of the torsion bar and the another side in the axial direction of the torsion bar, a pre-tensioner positioned at the another side of the spool and configured to generate a rotating drive force for rotating the spool in a retracting direction of a seat belt in a condition of rapid deceleration of a motor vehicle, a locking device capable of locking the another side of the torsion bar such that a rotation of the spool in a withdrawal direction of the seat belt is suppressed at both an operating time of the pre-tensioner when the pre-tensioner is activated and a non-operating time of the pre-tensioner when the pre-tensioner is not activated, and a locking member disposed at the another side of the spool and connected to the another side of the torsion bar;

the seat belt configured to be retracted by the seat belt retractor in a manner so as to be capable of being withdrawn, and restraining the occupant;

a tongue provided on the seat belt; and a buckle device configured to be latched with the tongue, wherein the locking device comprises a locking gear disposed at the one side of the spool, a joint pin, and a pawl rotatably provided in the locking member, wherein the locking device is configured to lock the another side of the torsion bar by locking the locking member on a frame with the pawl at the non-operating time of the pre-tensioner by rotating the pawl in a locking direction using the locking gear via the joint pin.

* * * * *